US012257571B2

(12) United States Patent
Sheng et al.

(10) Patent No.: US 12,257,571 B2
(45) Date of Patent: Mar. 25, 2025

(54) BIMETALLIC PEROVSKITE LOADED GRAPHENE-LIKE CARBON NITRIDE VISIBLE-LIGHT PHOTOCATALYST AND ITS PREPARATION METHOD

(71) Applicant: Yangtze Delta Region Institute (Huzhou), University of Electronic Science and Technology of China, Huzhou (CN)

(72) Inventors: Jianping Sheng, Huzhou (CN); Ye He, Huzhou (CN); Guo Zhang, Huzhou (CN); Fan Dong, Huzhou (CN)

(73) Assignee: YANGTZE DELTA REGION INSTITUTE (HUZHOU), UNIVERSITY OF ELECTRONIC SCIENCE AND TECHNOLOGY OF CHINA, Huzhou (CN)

( * ) Notice: Subject to any disclaimer, the term of this patent is extended or adjusted under 35 U.S.C. 154(b) by 25 days.

(21) Appl. No.: 17/948,794

(22) Filed: Sep. 20, 2022

(65) Prior Publication Data
US 2023/0364591 A1    Nov. 16, 2023

(30) Foreign Application Priority Data
May 16, 2022   (CN) .......................... 202210531131.7

(51) Int. Cl.
*B01J 27/24*    (2006.01)
*B01J 35/39*    (2024.01)
*B01J 37/00*    (2006.01)

(52) U.S. Cl.
CPC .............. *B01J 27/24* (2013.01); *B01J 35/39* (2024.01); *B01J 37/0027* (2013.01)

(58) Field of Classification Search
CPC ........ B01J 27/24; B01J 35/39; B01J 37/0027; B01J 21/18; B01J 23/681; B01J 27/26;
(Continued)

(56) References Cited

U.S. PATENT DOCUMENTS

2022/0127156 A1*  4/2022  Levy .................... C09K 11/628

FOREIGN PATENT DOCUMENTS

CN    110860304 A   *   3/2020   .............. B01J 27/24
CN    113617351 A   *  11/2021

OTHER PUBLICATIONS

Song et al., Environmentally Stable Mesoporous g-C3N4 Modified Lead Free Double Perovskite Cs2AgBiBr6 for Highly Efficient Photocatalytic Hydrogen Evolution, published online Apr. 2022; Catalysis Letters, vol. 153, pp. 534-543, (2023) (Year: 2022).*

(Continued)

*Primary Examiner* — Coris Fung
*Assistant Examiner* — Ritu S Shirali
(74) *Attorney, Agent, or Firm* — Pilloff Passino & Cosenza LLP; Rachel Pilloff; Sean Passino (57) ABSTRACT

Disclosed is a method for preparing a bimetallic perovskite loaded grapheme-like carbon nitride photocatalyst, comprising: 11) dissolving $SbCl_3$ and AgCl in HCl solution under heating and constant stirring; then adding CsCl in the heated solution to form sediment on the bottom of the beaker; collecting the sediment and wash it with ethanol, and finally drying in an oven to obtain $Cs_2AgSbCl_6$ powder; 12) adding melamine into an aluminum oxide crucible and placing it into a muffle furnace for calcination and finally cooling to room temperature naturally to obtain $g\text{-}C_3N_4$ samples; 13) adding the $Cs_2AgSbCl_6$ bimetallic perovskite and the $g\text{-}C_3N_4$ into a solvent, and stirring after subjecting to ultrasound, and drying after centrifuging to obtain the photocatalyst. Provided is a new idea for the combination of bimetallic halide perovskite and photocatalytic material, and the preparation method has mild conditions, simple operation, and is favorable for large-scale production.

8 Claims, 4 Drawing Sheets

(58) Field of Classification Search
CPC . B01J 37/009; B01J 37/04; B01J 37/08; B01J 37/082; B01J 37/088; B01J 37/343; B01J 23/005; B01J 27/10; Y02E 60/36; B01D 53/007; B01D 53/8628; B01D 2255/802; B01D 2257/404; B01D 2258/06
USPC .......................................................... 502/174
See application file for complete search history.

(56) References Cited

OTHER PUBLICATIONS

Rodrigues, Experimental and Theoretical Investigations on the Structural, Electronic, and Vibrational Properties of Cs2AgSbCl6 Double Perovskite, 2021, Industrial & Engineering Chemistry Research, 60, 18918-18928 (Year: 2021).*

Final Materials: Crucibles [online], [capture from Dec. 3, 2020]. Retrieved from the internet < URL: https://web.archive.org/web/20201203191028/https://www.final-materials.com/gb/379-crucibles > (Year: 2020).*

Liu et al., Simple pyrolysis of urea into graphitic carbon nitride with recyclable adsorption and photocatalytic activity, 2011, Journal of Materials Chemistry, 21, 14398-14401 (Year: 2011).*

Machine translation of CN 113617351 A, originally published Nov. 2021 to Bai et al. (Year: 2021).*

Zhang et al., Photocatalytic degradation of ofloxacin by perovskite-type NaNbO3 nanorods modified g-C3N4 heterojunction under simulated solar light: Theoretical calculation, ofloxacin degradation pathways and toxicity evolution, 2020, Chemical Engineering Journal, 400, 125918 (Year: 2020).*

Jimenez-Calvo et al., Influence of the gas atmosphere during the synthesis of g-C3N4 for enhanced photocatalytic H2 production from water on Au/g-C3N4 composites, 2019, Journal of Materials Chemistry A, 7, 14849-14863 (Year: 2019).*

Machine translation of CN 110860304 A, originally published Mar. 2020 to Huang et al. (Year: 2020).*

Kshirsagar et al., Synthesis and optical properties of colloidal Cs2AgSb1-xBixCl6 double perovskite nanocrystals, 2019, The Journal of Chemical Physics, 151, 161101 (Year: 2019).*

\* cited by examiner

BIMETALLIC PEROVSKITE LOADED GRAPHENE-LIKE CARBON NITRIDE VISIBLE-LIGHT PHOTOCATALYST AND ITS PREPARATION METHOD

CROSS-REFERENCE TO RELATED PATENT APPLICATIONS

The present application claims the benefit of Chinese Application No. 202210531131.7, filed on May 16, 2022, entitled "BIMETALLIC PEROVSKITE LOADED GRAPHENE-LIKE CARBON NITRIDE VISIBLE-LIGHT PHOTOCATALYST AND ITS PREPARATION METHOD", which is incorporated by reference herein in its entirety.

TECHNICAL FIELD

The present disclosure relates to a technical field of photocatalyst preparation, and specifically, relates to a $Cs_2AgSbCl_6$ bimetallic perovskite loaded graphene-like carbon nitride (g-$C_3N_4$) visible-light photocatalyst and its preparation method.

BACKGROUND

With the development of industrialization, nitrogen oxides (NOx) released from fossil fuel combustion seriously endanger human health, since NO not only plays a key role in the formation of smog, but also leads to the formation of acid rain, which is a problem that needs to be solved urgently. Although some conventional technologies (SCR, absorption, adsorption) have been used to deal with emissions of high concentrations of NOx, it is not economically feasible to purify low concentrations of NO in the air.

With the rapid development of economy, people begin to be aware of the importance of environmental protection. In recent years, in the face of the pressure and challenges brought about by the increasingly serious air pollution, developing a green and efficient chemical technology has become an urgent affair. Semiconductor photocatalysis, due to its environmental friendliness and less secondary pollution, has great potential in purifying NO at the ppb (parts per billion) level. Therefore, considerable efforts have been devoted to developing efficient photocatalysts to achieve the high performance required for environmental applications.

However, there are still many problems, such as semiconductor materials with unsatisfactory photocatalytic efficiency and selectivity, high electron-hole pair recombination efficiency, generation of toxic by-products, and innovation of materials that hinder the application of photocatalytic technology. Therefore, the search for a photocatalytic material that can improve the utilization of visible light has become top priority.

As an organic conjugated semiconductor photocatalyst, g-$C_3N_4$ with a layered structure possesses abundant covalent and hydrogen bonds. As a novel non-metallic photocatalytic material, g-$C_3N_4$ has a wider light absorption range. Therefore, it can also play a certain role in photocatalysis under visible light. Meanwhile, compared to $TiO_2$, g-$C_3N_4$ can effectively adsorb activated oxygen molecules to generate superoxide radicals, which can perform photocatalytic conversion of organic functional groups and photocatalytic degradation of organic pollutants. Therefore, it is suitable for air pollution purification and organic matter degradation. Meanwhile, g-$C_3N_4$ has good thermal stability and chemical stability, and maintains stable performance under strong acid and alkali, and can be prepared from various nitrogen-rich precursors (such as dicyandiamide, urea, melamine, thiourea, etc.). As an emerging photocatalyst, it has received more and more attention. However, unmodified g-$C_3N_4$ has problems, such as low crystallinity, large bulk structure, abundant internal defects, a small number of trap centers for photogenerated electrons and holes, and fast recombination of photogenerated carriers (electron-hole pairs) and slow charge transfer, which leads to a sharp drop in photocatalytic activity. Therefore, extensive research has been carried out on the modification of g-$C_3N_4$.

Bimetallic halide perovskite materials are widely used in the field of solar cells, which show better stability when exposed to light, humidity, and ambient air under working conditions. In addition, lead-free bimetallic perovskites are environmentally friendly materials. Since these materials have unique optoelectronic properties similar to those of lead-based organic-inorganic hybrid perovskites, they have broad application prospects. However, it is rarely used in the field of photocatalysis.

In recent years, studies have shown that perovskite heterojunctions lead to significant enhancement in the photovoltaic performance of corresponding devices, mainly due to improved carrier dynamics of synthetic heterojunctions. However, in the current research, there are few reports on load of bimetallic halide perovskites on photocatalytic materials. Therefore, the present disclosure makes attempts to form heterojunctions between bimetallic halide perovskites and photocatalytic materials for photocatalytic degradation. By constructing a heterojunction, the migration of carriers is accelerated, the separation of charges is promoted, and a good photocatalytic performance is obtained.

SUMMARY

An object of the present disclosure is to provide a method for preparing $Cs_2AgSbCl_6$ bimetallic perovskite loaded graphene-like carbon nitride (g-$C_3N_4$) visible-light photocatalyst, to address the deficiencies in the prior art.

The technical solution of the present disclosure is as follows:

A method for preparing a bimetallic perovskite loaded graphene-like carbon nitride visible-light photocatalyst, comprising the following steps of:

11) dissolving solid reagents $SbCl_3$ and AgCl in a beaker containing HCl solution under constant stirring and heating; adding CsCl into the heated solution to form sediment on the bottom of the beaker in a short time; collecting the sediment and washing it with ethanol and finally drying it in an oven; after cooling the oven to room temperature, taking out to obtain $Cs_2AgSbCl_6$ powder;

12) adding melamine to an aluminum oxide crucible, and placing it in a muffle furnace for calcination in static air after covering with a lid, and finally cooling to room temperature naturally, and collecting the g-$C_3N_4$ sample;

13) adding $Cs_2AgSbCl_6$ bimetallic perovskite and g-$C_3N_4$ into a solvent, and stirring after subjecting to ultrasound, and directly centrifuging followed by drying it to obtain the bimetallic perovskite loaded graphene-like carbon nitride photocatalyst.

Further, $SbCl_3$, AgCl, HCl, CsCl in step (11) are in an amount of 1 mmol, 1 mmol, 12 ml, 2 mmol, respectively.

Further, a temperature for heating and dissolving in step (11) is 80° C.

Further, the sediment is collected and washed with ethanol and finally dried in the oven for 5-7 h in step (11).

Further, the melamine in step (12) is in an amount of 10 g.

Further, the calcination in step (12) is performed under a calcination temperature of 450-550° C., a calcination time of 0.5-2 h and a heating rate of 10-15° C./min.

Further, a mass ratio of $Cs_2AgSbCl_6$ bimetallic perovskite to $g-C_3N_4$ is (0.0016-0.016): 0.8.

Further, the solvent in step (13) is one or more of ethanol and isopropanol.

Further, the ultrasound is performed for 10-30 min followed by stirring for 3-5 h in step (13).

Further, a drying temperature in step (13) is 60° C.

The present disclosure has the following beneficial effects:

As can be seen from experimental analysis, for the $Cs_2AgSbCl_6$ bimetallic perovskite and $g-C_3N_4$ visible-light photocatalyst obtained by the preparation method provided by the present disclosure, the heterojunctions accelerate the migration of carriers, and electrons pass through the $g-C_3N_4$ and transfer onto the $Cs_2AgSbCl_6$ bimetallic perovskite, thereby inhibiting the electron-hole recombination efficiency and improving the charge transfer performance, promoting the generation of free radicals, and thus improving its visible-light photocatalytic activity.

BRIEF DESCRIPTION OF DRAWINGS

In order to illustrate the technical solutions in the examples of the present disclosure more clearly, the accompanying drawings required in the description of the examples will be briefly introduced below. Obviously, for those skilled in the art, without creative efforts, other drawings can also be obtained according to these accompanying drawings.

DETAILED DESCRIPTION

Figure 1:
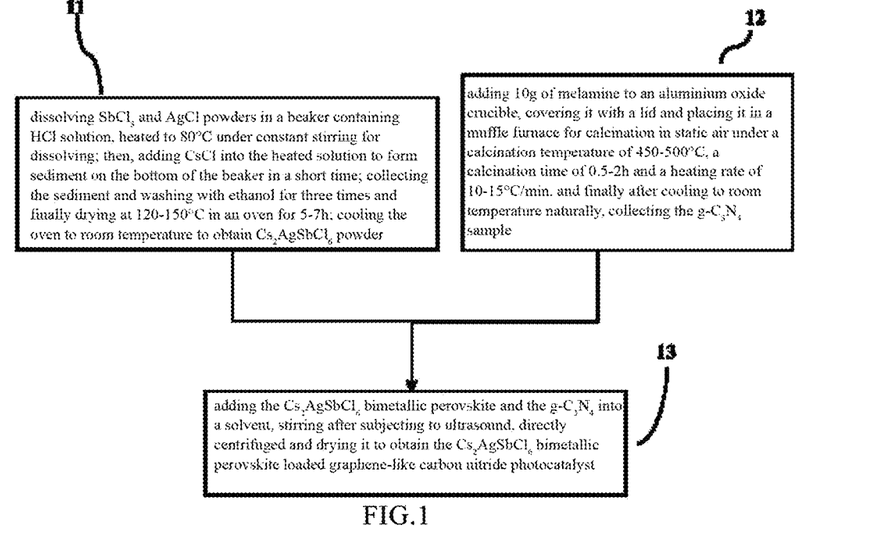
FIG. 1 is a flow chart of a method of preparing $Cs_2AgSbCl_6$ bimetallic perovskite loaded graphene-like carbon nitride ($g-C_3N_4$) visible-light photocatalyst provided in Examples of the present disclosure.

Referring to FIG. 1, the Examples 1, 2, 3 and 4 of the present disclosure provide methods of preparing $Cs_2AgSbCl_6$ bimetallic perovskite loaded graphene-like carbon nitride ($g-C_3N_4$) visible-light photocatalysts, comprising the following steps of:

11) dissolving 1 mmol of $SbCl_3$ and 1 mmol of AgCl solid reagents in a beaker containing 12 ml of HCl solution, and heating it to 80° C. with constant stirring to dissolve; then, adding 2 mmol of CsCl into the heated solution to form sediment on the bottom of the beaker in a short time; collecting the sediment and washing it three times with ethanol, and finally drying it in an oven at 120-150° C. for 5-7 h; after cooling the oven to room temperature, taking out to obtain $Cs_2AgSbCl_6$ powder;

12) adding 10 g of melamine into an aluminum oxide crucible, and after covering with a lid, placing it in a muffle furnace for calcination in static air under a calcination temperature of 450-500° C., a calcination time of 0.5-2 h and a heating rate of 10~15° C./min, and finally cooling it to room temperature naturally, and collecting the $g-C_3N_4$ samples;

13) adding $Cs_2AgSbCl_6$ bimetallic perovskite and $g-C_3N_4$ into a solvent, and after subjecting to ultrasound for 10~30 min, stirring for 3~5 h, and directly centrifuging and drying at 60° C. to obtain the $Cs_2AgSbCl_6$ bimetallic perovskite loaded graphene-like graphene carbon nitride ($g-C_3N_4$) visible-light photocatalyst.

As can be seen from experimental analysis, for the $Cs_2AgSbCl_6$ bimetallic perovskite and $g-C_3N_4$ visible-light photocatalyst obtained by the preparation methods provided by the present disclosure, the heterojunctions accelerate the migration of carriers, and electrons pass through the $g-C_3N_4$ and transfer onto the $Cs_2AgSbCl_6$ bimetallic perovskite, thereby inhibiting the electron-hole recombination efficiency and improving the charge transfer performance, promoting the generation of free radicals, and thus improving its visible-light photocatalytic activity.

Figure 2:
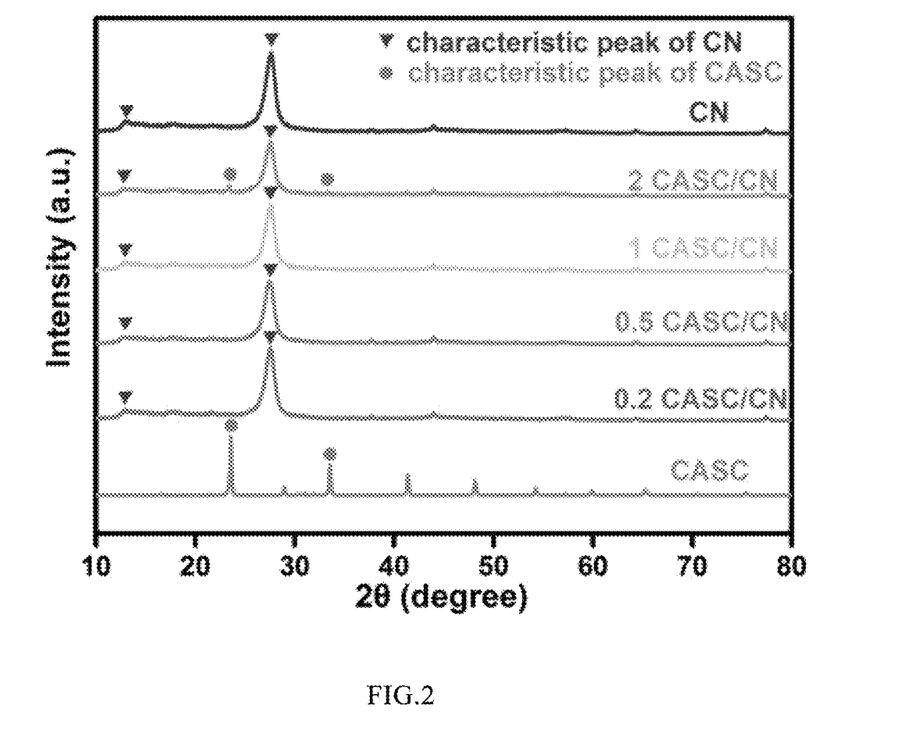
FIG. 2 is XRD patterns (XRD is an abbreviation of X-ray diffraction) of $Cs_2AgSbCl_6$ bimetallic perovskite loaded graphene-like nitride oxide ($g-C_3N_4$) visible-light photocatalysts with four different mass ratios of $Cs_2AgSbCl_6$ (0.2%, 0.5%, 1%, 2%) prepared in Examples 1, 2, 3 and 4 of the present disclosure, and pure phase $Cs_2AgSbCl_6$, and $g-C_3N_4$.

By characterizing the $Cs_2AgSbCl_6$ bimetallic perovskite loaded graphene-like carbon nitride (g-$C_3N_4$) visible-light photocatalysts prepared in Examples 1, 2, 3 and 4 of the present disclosure, it can be seen that the $Cs_2AgSbCl_6$ bimetallic perovskite loaded graphene-like carbon nitride (g-$C_3N_4$) visible-light photocatalysts exhibit the following characteristics:

(1) XRD analysis was performed on $Cs_2AgSbCl_6$ bimetallic perovskite loaded graphene-like carbon nitride (g-$C_3N_4$) visible-light photocatalysts and the pure phase $Cs_2AgSbCl_6$ and g-$C_3N_4$ (as shown in FIG. 2) and confirmed that the $Cs_2AgSbCl_6$ bimetallic perovskite loaded graphene-like carbon nitride (g-$C_3N_4$) visible-light photocatalysts and the pure phase $Cs_2AgSbCl_6$ and g-$C_3N_4$ had a complete and stable g-$C_3N_4$ crystal structure, and that the characteristic peaks of the $Cs_2AgSbCl_6$ and the g-$C_3N_4$ appeared in the $Cs_2AgSbCl_6$/g-$C_3N_4$ heterojunction material with the increasing loading of the $Cs_2AgSbCl_6$.

Figure 3:
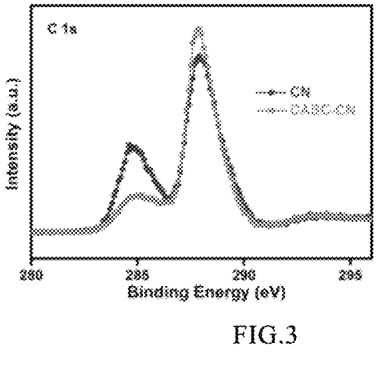
FIGS. 3 and 4 are XPS patterns (XPS is an abbreviation of X-ray photoelectron spectroscopy) of $Cs_2AgSbCl_6$ bimetallic perovskite loaded graphene-like carbon nitride ($g-C_3N_4$) visible-light photocatalyst prepared in Example 2 of the present disclosure with 0.5% loading and the pure phase $g-C_3N_4$, respectively.
Figure 4:
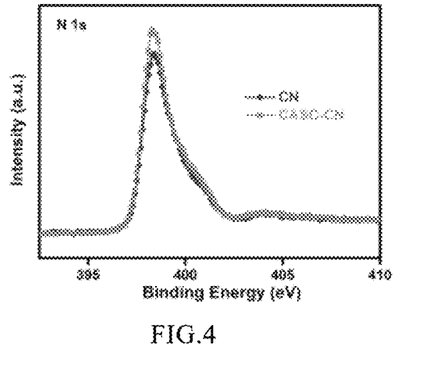
Figure 5:
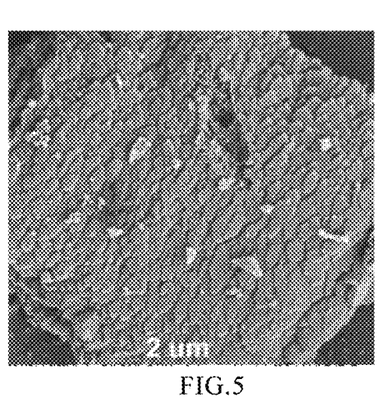
FIGS. 5 and 6 are SEM images (SEM is an abbreviation of Scanning Electron Microscope) of the pure phase $g-C_3N_4$ prepared in the Examples of the present disclosure and $Cs_2AgSbCl_6$ bimetallic perovskite loaded graphene-like carbon nitride ($g-C_3N_4$) visible-light photocatalyst with 0.5% loading prepared in Example 2, respectively.
Figure 6:
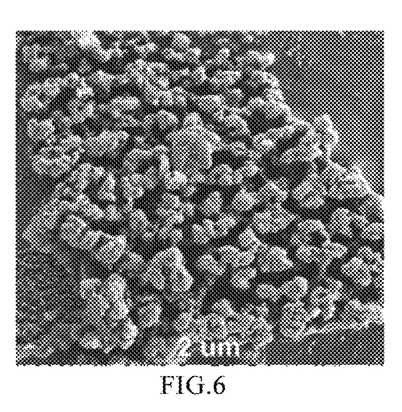
Figure 7:
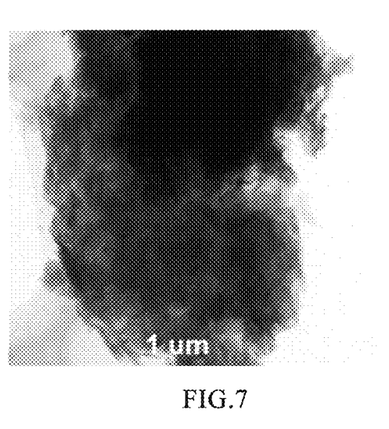
FIGS. 7 and 8 are TEM images (TEM is an abbreviation of Transmission Electron Microscope) of the pure-phase $g-C_3N_4$ prepared in Examples of the present disclosure and $Cs_2AgSbCl_6$ bimetallic perovskite loaded graphene-like carbon nitride ($g-C_3N_4$) visible-light photocatalyst with 0.5% loading prepared in Example 2, respectively.
Figure 8:
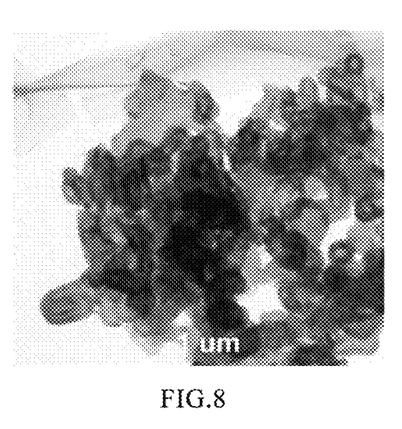

(2) XPS analysis was performed on the $Cs_2AgSbCl_6$ bimetallic perovskite loaded graphene-like carbon nitride (g-$C_3N_4$) visible light catalyst and the pure phase g-$C_3N_4$ (as shown in FIGS. 3 and 4), and confirmed that the $Cs_2AgSbCl_6$ loaded composite material of the $Cs_2AgSbCl_6$ bimetallic perovskite loaded graphene-like carbon nitride (g-$C_3N_4$) visible-light photocatalysts prepared in Example 1, 2, 3 and 4 of the present disclosure had the same elements as the pure phase g-$C_3N_4$ and no other impurity elements; SEM analysis and TEM analysis was performed on the pure phase g-$C_3N_4$ and $Cs_2AgSbCl_6$ bimetallic perovskite loaded graphene-like carbon nitride (g-$C_3N_4$) visible-light photocatalysts (as shown in FIGS. 5, 6, 7 and 8), and confirmed the successful preparation of the materials that exhibited a loose and porous structure.

Figure 9:
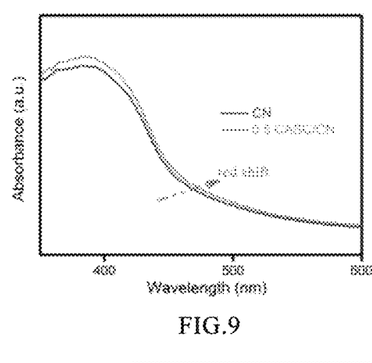
FIG. 9 is UV-Vis DRS patterns (UV-Vis DRS is UV-Visible Diffuse-reflection Spectra) of $Cs_2AgSbCl_6$ bimetallic perovskite loaded graphene-like carbon nitride ($g-C_3N_4$) visible-light photocatalyst with 0.5% loading prepared in Example 2 of the present disclosure and the pure-phase $g-C_3N_4$ prepared in Examples, respectively.
Figure 10:
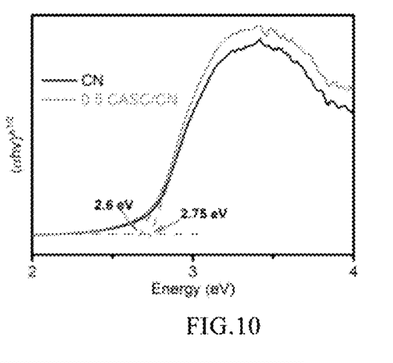
FIG. 10 is a band gap map of the two materials.

(3) UV-VisDRS analysis was performed on the $Cs_2AgSbCl_6$ bimetallic perovskite loaded graphene-like carbon nitride (g-$C_3N_4$) visible-light photocatalyst with a mass percentage of 0.5% prepared in Example 2 and the pure phase g-$C_3N_4$ (as shown in FIG. 9) to test its photoresponse range, and confirmed that the introduction of $Cs_2AgSbCl_6$ can enhance the absorption of light from the ultraviolet-visible-infrared region by the g-$C_3N_4$. Meanwhile, the band gap of 0.5% $Cs_2AgSbCl_6$ bimetallic perovskite loaded graphene-like carbon nitride (g-$C_3N_4$) visible-light photocatalyst (2.6 eV) was narrower than that of the pure phase g-$C_3N_4$ (2.75 eV), as shown in the band gap map calculated from UV-visDRS (FIG. 10), which indicated that the light absorption and electron-hole pair separation of the pure phase g-$C_3N_4$ could be improved to a certain extent by the loading of $Cs_2AgSbCl_6$.

The photocatalytic performance of the $Cs_2AgSbCl_6$ bimetallic perovskite loaded graphene-like carbon nitride (g-$C_3N_4$) visible-light photocatalysts prepared by Examples 1, 2, 3 and 4 of the present disclosure was tested by degrading NO. The test process was as follows:

(1) 0.2 g of the $Cs_2AgSbCl_6$ bimetallic perovskite loaded graphene-like carbon nitride (g-$C_3N_4$) visible-light photocatalyst prepared in either of the examples was placed on a glass disc;

(2) Four small fans were installed around a reactor;

(3) Under dark conditions, when the concentration of NO reached equilibrium, the $Cs_2AgSbCl_6$ bimetallic perovskite loaded graphene-like carbon nitride (g-$C_3N_4$) visible-light photocatalyst was irradiated with a 150 W halogen tungsten lamp for 30 min.

The conditions of the above catalytic performance test process included: a relative humidity of 60%; an oxygen content of 21%; a NO gas flow rate of 2.24 L/min; an initial NO concentration of 550 μg/kg; filtering out UV light with a 420 nm cut-off filter before irradiating with the halogen tungsten lamp.

Figure 11:
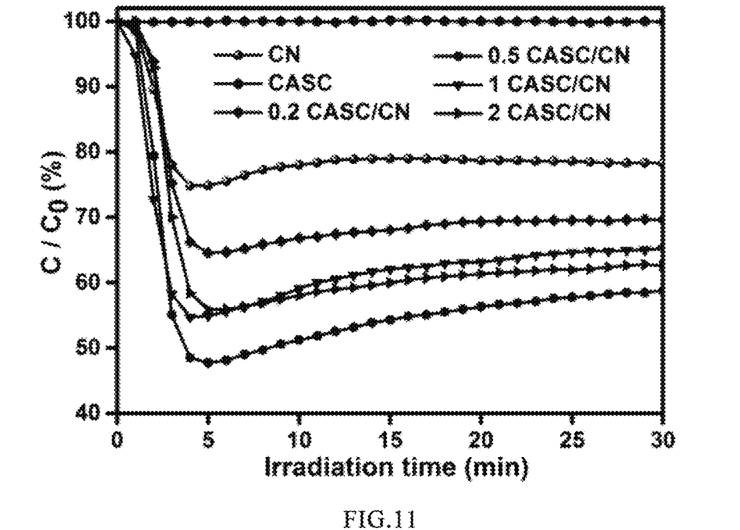
FIG. 11 is an image of comparison of the degradation efficiency for NO purification under visible-light condition between $Cs_2AgSbCl_6$ bimetallic perovskite loaded graphene-like nitride oxides ($g-C_3N_4$) visible-light photocatalysts with four different mass ratios of $Cs_2AgSbCl_6$ (0.2%, 0.5%, 1%, 2%) prepared in Examples 1, 2, 3 and 4 of the present disclosure and the pure phase $Cs_2AgSbCl_6$ and $g-C_3N_4$.

The $Cs_2AgSbCl_6$ bimetallic perovskite loaded graphene-like carbon nitride (g-$C_3N_4$) visible-light photocatalysts provided in examples of the present disclosure have the following degradation effects on NO degradation:

(1) The $Cs_2AgSbCl_6$ bimetallic perovskite loaded graphene-like carbon nitride (g-$C_3N_4$) visible-light photocatalyst has a NO degradation efficiency of 30%~50% (as shown in FIG. 11), which is higher than the NO degradation efficiency of the pure phase g-$C_3N_4$ of 21%; the calculation formula of the degradation efficiency is $\eta(\%)=(1-C/C_0)\times100\%$, where $C_0$ is an initial NO concentration and $C$ is an instantaneous concentration of NO.

Figure 12:
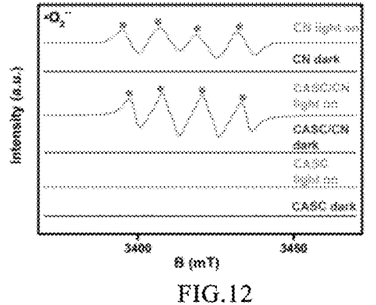
FIG. 12 is ESR ($\cdot O_2^-$) patterns (ESR is an abbreviation of Electron Spin Resonance) of $Cs_2AgSbCl_6$ bimetallic perovskite loaded graphene-like nitride oxides ($g-C_3N_4$) visible-light photocatalyst prepared in Example 2 of the present disclosure with a mass ratio of 0.5% and the pure phase $Cs_2AgSbCl_6$ and $g-C_3N_4$.
Figure 13:
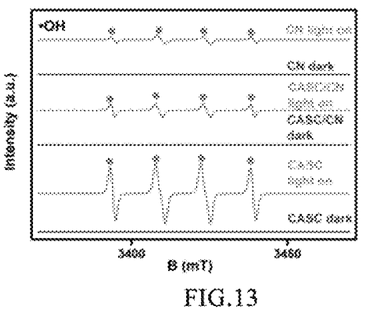
FIG. 13 is ESR ($\cdot OH$) patterns of the $Cs_2AgSbCl_6$ bimetallic perovskite loaded graphene-like carbon nitride ($g-C_3N_4$) visible-light photocatalyst with a mass ratio of 0.5% prepared in Example 2 of the present disclosure and the pure phase $Cs_2AgSbCl_6$ and $g-C_3N_4$.

(2) Superoxide ion ($\cdot O2^-$) is the most important degradation radical for the degradation of NO under visible-light by the $Cs_2AgSbCl_6$ bimetallic perovskite loaded graphene-like carbon nitride (g-$C_3N_4$) visible-light photocatalysts (as shown in FIG. 12), and hydroxyl ion ($\cdot OH$) is the secondary degradation radical (as shown in FIG. 13).

Figure 14:
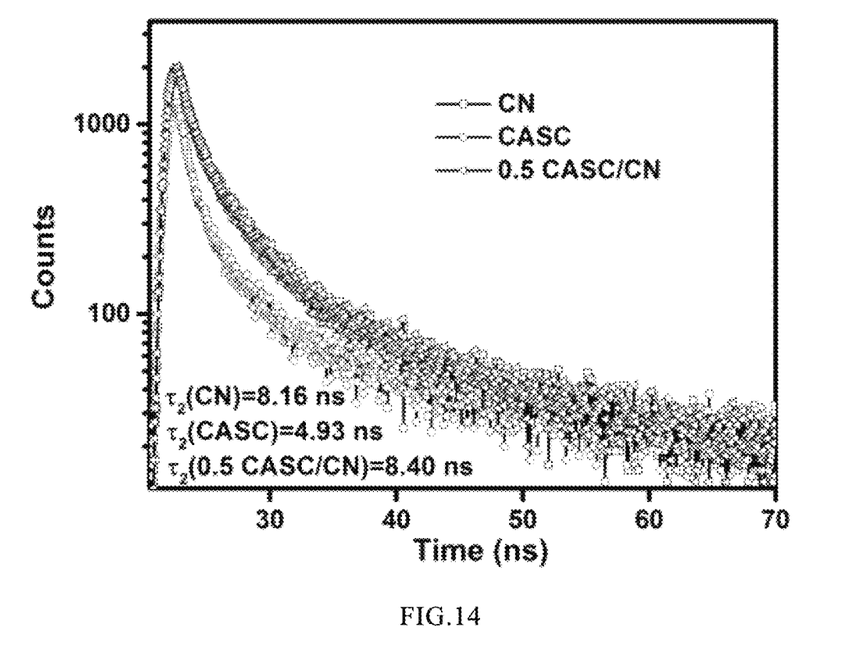
FIG. 14 is a time-resolved fluoroimmunoassay image of 0.5% $Cs_2AgSbCl_6$ bimetallic perovskite loaded graphene-like carbon nitride ($g-C_3N_4$) visible-light photocatalyst prepared in Example 2 of the present disclosure and the pure-phase $Cs_2AgSbCl_6$ and $g-C_3N_4$.

(3) The time-resolved flurescence test was performed on the $Cs_2AgSbCl_6$ bimetallic perovskite loaded graphene-like carbon nitride (g-$C_3N_4$) visible-light photocatalyst and the pure phase $Cs_2AgSbCl_6$ and g-$C_3N_4$, and confirmed that the flurescence lifetime of the $Cs_2AgSbCl_6$ bimetallic perovskite loaded graphene-like carbon nitride (g-$C_3N_4$) photocatalyst was increased, and the separation effect of photogenerated electrons and holes was enhanced (as shown in FIG. 14).

Several specific examples are listed for the preparation method disclosed in the present disclosure, and the described examples are only a part of the embodiments of the present disclosure. Based on the examples of the present disclosure, all embodiments obtainable by those skilled in the art without creative labor fall into the scope of protection of the present disclosure.

Example 1

A method for preparing a $Cs_2AgSbCl_6$ bimetallic perovskite loaded graphene-like carbon nitride (g-$C_3N_4$) visible-light photocatalyst included the following steps:

1 mmol of $SbCl_3$ and 1 mmol of AgCl solid reagents were weighed and dissolved in a beaker containing 12 ml of HCl solution and heated to 80° C. with constant stirring to dissolve. 2 mmol of CsCl was then added into the heated solution. Sediment was soon formed at the bottom of the beaker. The sediment was collected and washed three times with ethanol and finally dried in an oven at 150° C. for 7 h. After cooling the oven to room temperature, $Cs_2AgSbCl_6$ powder was taken out and obtained; 10 g of melamine was weighed and added to an aluminum oxide crucible and was placed in a muffle furnace for calcination after covering with a lid. The calcination was performed in static air, and the calcination temperature was 550° C., and the calcination time was 2 h, and the heating rate was 10° C./min. Finally, after cooling to room temperature naturally, the g-$C_3N_4$ sample was collected. 0.0016 g of the $Cs_2AgSbCl_6$ bimetallic perovskite and 0.8 g of the g-$C_3N_4$ were added to 200 ml of ethanol, subjected to ultrasound for 30 min, stirred for 4 h, directly centrifuged and dried at 60° C. to obtain 0.2% $Cs_2AgSbCl_6$ bimetallic perovskite loaded graphene-like carbon nitride (g-$C_3N_4$) visible-light photocatalyst.

The mass ratio of $Cs_2AgSbCl_6$ bimetallic perovskite loaded graphene-like carbon nitride (g-$C_3N_4$) visible-light photocatalyst prepared in Example 1 of the present disclosure was 0.2%. The 0.2% $Cs_2AgSbCl_6$ bimetallic perovskite loaded graphene-like carbon nitride (g-$C_3N_4$) visible-light photocatalyst was used for NO degradation. The specific process was as follows: under the conditions of a relative humidity of 60%, an oxygen content of 21%, a flow rate of NO gas flow of 2.24 L/min and an initial concentration of NO of 550 m/kg, 0.2 g of the 0.2% $Cs_2AgSbCl_6$ bimetallic perovskite loaded graphene-like carbon nitride (g-$C_3N_4$) visible-light photocatalyst prepared in Example 1 was placed on a glass disc; four small fans were installed around the reactor; under dark conditions, a 420 nm cut-off filter was used to filter out UV light, and when the NO concentration reached equilibrium, a 150 W halogen tungsten lamp was used to irradiate the $Cs_2AgSbCl_6$ Bimetallic perovskite loaded graphene-like carbon nitride (g-$C_3N_4$) visible-light photocatalyst for 30 min; the lamp was turned off finally. After calculation, the $Cs_2AgSbCl_6$ bimetallic perovskite loaded graphene-like carbon nitride (g-$C_3N_4$) visible-light photocatalyst prepared in Example 1 of the present disclosure had a NO degradation efficiency of 31%. Compared to two substrates, the $Cs_2AgSbCl_6$ bimetallic perovskite loaded graphene-like carbon nitride (g-$C_3N_4$) visible-light photocatalyst has the improved NO degradation efficiency.

Example 2

A method for preparing a $Cs_2AgSbCl_6$ bimetallic perovskite loaded graphene-like carbon nitride (g-$C_3N_4$) visible-light photocatalyst included the following steps:

1 mmol of $SbCl_3$ and 1 mmol of AgCl solid reagents were weighed and dissolved in a beaker containing 12 ml of HCl solution and heated to 80° C. with constant stirring to dissolve. 2 mmol of CsCl was then added into the heated solution. Sediment was soon formed at the bottom of the beaker. The sediment was collected and washed three times with ethanol and finally dried in an oven at 150° C. for 7 h. After cooling the oven to room temperature, $Cs_2AgSbCl_6$ powder was taken out and obtained; 10 g of melamine was weighed and added to an aluminum oxide crucible and was placed in a muffle furnace for calcination after covering with a lid. The calcination was performed in static air, and the calcination temperature was 550° C., and the calcination time was 2 h, and the heating rate was 10° C./min. Finally, after cooling to room temperature naturally, the g-$C_3N_4$ sample was collected. 0.004 g of the $Cs_2AgSbCl_6$ bimetallic perovskite and 0.8 g of the g-$C_3N_4$ were added to 200 ml of ethanol, subjected to ultrasound for 30 min, stirred for 4 h, directly centrifuged and dried at 60° C. to obtain 0.5% $Cs_2AgSbCl_6$ bimetallic perovskite loaded graphene-like carbon nitride (g-$C_3N_4$) visible-light photocatalyst.

The mass ratio of the $Cs_2AgSbCl_6$ bimetallic perovskite loaded graphene-like carbon nitride (g-$C_3N_4$) visible-light photocatalyst prepared in Example 2 of the present disclosure was 0.5%. The 0.5% $Cs_2AgSbCl_6$ bimetallic perovskite loaded graphene-like carbon nitride (g-$C_3N_4$) visible-light photocatalyst was used for NO degradation, and the test process was the same as that of Example 1. After calculation, the $Cs_2AgSbCl_6$ bimetallic perovskite loaded graphene-like carbon nitride (g-$C_3N_4$) visible-light photocatalyst prepared in Example 2 of the present disclosure had a NO degradation efficiency of 43%. Compared to two substrates, the $Cs_2AgSbCl_6$ bimetallic perovskite loaded graphene-like carbon nitride (g-$C_3N_4$) visible-light photocatalyst had the improved NO degradation efficiency.

Example 3

A method for preparing a $Cs_2AgSbCl_6$ bimetallic perovskite loaded graphene-like carbon nitride (g-$C_3N_4$) visible-light photocatalyst included the following steps:

1 mmol of $SbCl_3$ and 1 mmol of AgCl solid reagents were weighed and dissolved in a beaker containing 12 ml of HCl solution and heated to 80° C. with constant stirring to dissolve. 2 mmol of CsCl was then added into the heated solution. Sediment was soon formed at the bottom of the beaker. The sediment was collected and washed three times with ethanol and finally dried in the oven at 150° C. for 7 h. After cooling the oven to room temperature, $Cs_2AgSbCl_6$ powder was taken out and obtained; 10 g of melamine was weighed and added to an aluminum oxide crucible and was placed in a muffle furnace for calcination after covering with a lid. The calcination condition was performed in static air, and the calcination temperature was 550° C., and the calcination time was 2 h, and the heating rate was 10° C./min. Finally, after cooling to room temperature naturally, the g-$C_3N_4$ sample was collected. 0.008 g of the $Cs_2AgSbCl_6$ bimetallic perovskite and 0.8 g of the g-$C_3N_4$ were added to 200 ml of ethanol, and subjected to ultrasound for 30 min, stirred for 4 h, directly centrifuged and dried at 60° C. to obtain 1% $Cs_2AgSbCl_6$ bimetallic perovskite loaded graphene-like carbon nitride (g-$C_3N_4$) visible-light photocatalyst.

The mass ratio of the $Cs_2AgSbCl_6$ bimetallic perovskite loaded graphene-like carbon nitride (g-$C_3N_4$) visible-light photocatalyst prepared in Example 3 of the present disclosure was 1%. The 1% $Cs_2AgSbCl_6$ bimetallic perovskite loaded graphene-like carbon nitride (g-$C_3N_4$) visible-light photocatalyst was used for NO degradation, and the test process was the same that of Example 1. After calculation, the $Cs_2AgSbCl_6$ bimetallic perovskite loaded graphene-like carbon nitride (g-$C_3N_4$) visible-light photocatalyst prepared in Example 3 of the present disclosure had a NO degradation efficiency of 35%. Compared to two substrates, the $Cs_2AgSbCl_6$ bimetallic perovskite loaded graphene-like carbon nitride (g-$C_3N_4$) visible-light photocatalyst had the improved NO degradation efficiency.

Example 4

A method for preparing a $Cs_2AgSbCl_6$ bimetallic perovskite loaded graphene-like carbon nitride (g-$C_3N_4$) visible-light photocatalyst included the following steps:

1 mmol of $SbCl_3$ and 1 mmol of AgCl solid reagents were weighed and dissolved in a beaker containing 12 ml of HCl solution and heated to 80° C. with constant stirring to dissolve. 2 mmol of CsCl was then added into the heated solution. Sediment was soon formed at the bottom of the beaker. The sediment was collected and washed three times with ethanol and finally dried in the oven at 150° C. for 7 h. After cooling the oven to room temperature, $Cs_2AgSbCl_6$ powder was taken out and obtained; 10 g of melamine was weighed and added to an aluminum oxide crucible and was placed in a muffle furnace for calcination after covering with a lid. The calcination condition was performed in static air, and the calcination temperature was 550° C., and the calcination time was 2 h, and the heating rate was 10° C./min.

Finally, after cooling to room temperature naturally, the g-$C_3N_4$ sample was collected. 0.016 g of the $Cs_2AgSbCl_6$ bimetallic perovskite and 0.8 g of the g-$C_3N_4$ were added to 200 ml of ethanol, and after subjected to ultrasound for 30 min, stirred for 4 h, directly centrifuged and dried at 60° C. to obtain 2% $Cs_2AgSbCl_6$ bimetallic perovskite loaded graphene-like carbon nitride (g-$C_3N_4$) visible-light photocatalyst.

The 2% $Cs_2AgSbCl_6$ bimetallic perovskite loaded graphene-like carbon nitride (g-$C_3N_4$) visible-light photocatalyst prepared in Example 4 of the present disclosure was used for NO degradation, and the test process was the same that of Example 1. After calculation, the $Cs_2AgSbCl_6$ bimetallic perovskite loaded graphene-like carbon nitride (g-$C_3N_4$) visible-light photocatalyst prepared in Example 4 of the present disclosure had a NO degradation efficiency of 37%. Compared to two substrates, the $Cs_2AgSbCl_6$ bimetallic perovskite loaded graphene-like carbon nitride (g-$C_3N_4$) visible-light photocatalyst had the improved NO degradation efficiency.

From the above examples, it can be seen from comparison between the degradation of NO by the $Cs_2AgSbCl_6$ bimetallic perovskite loaded graphene-like carbon nitride (g-$C_3N_4$) visible-light photocatalyst and the degradation of NO by pure phase $Cs_2AgSbCl_6$ and g-$C_3N_4$, the degradation efficiency of the $Cs_2AgSbCl_6$ bimetallic perovskite-supported graphene-like carbon nitride (g-$C_3N_4$) visible photocatalyst was significantly improved. Moreover, there are few research reports on the use of bimetallic halide perovskite materials in the field of photocatalysis, which is worth further exploration and application.

It should be noted that the catalytic mechanism of the $Cs_2AgSbCl_6$ bimetallic perovskite loaded graphene-like carbon nitride (g-$C_3N_4$) visible-light catalysts provided in the examples of the present disclosure for sulfides, volatile organic compounds, non-NO nitrogen oxides and other air pollutants was the same as the catalytic mechanism for NO, and therefore, the degradation test of NO in the examples of the present invention are representative.

While the present disclosure has been described with specific examples, for those skilled in the art, any variants and modifications made within the spirit and principle of the present disclosure defined by claims should be included in the protection scope of the present disclosure.

What is claimed is:

1. A method for preparing a bimetallic perovskite loaded graphene-like carbon nitride photocatalyst, comprising the following steps of:
   (11) dissolving $SbCl_3$ and AgCl solid reagents in a beaker containing HCl solution under constant stirring and heating; then, adding CsCl in the heated solution to form sediment on the bottom of the beaker; collecting the sediment and washing the sediment with ethanol and finally drying in an oven; after cooling the oven to room temperature, taking out to obtain $Cs_2AgSbCl_6$ powder;
   (12) adding melamine to an aluminum oxide crucible and covering the aluminum oxide crucible with a lid, placing the aluminum oxide crucible in a muffle furnace for calcination in static air, and finally after cooling to room temperature naturally, collecting g-$C_3N_4$ sample;
   (13) adding the $Cs_2AgSbCl_6$ powder and the g-$C_3N_4$ to a solvent, stirring after subjecting to ultrasound, and directly centrifuging followed by drying to obtain the bimetallic perovskite loaded graphene-like carbon nitride photocatalyst,
   wherein a mass ratio of $Cs_2AgSbCl_6$ powder to g-$C_3N_4$ in step (13) is (0.0016-0.016): 0.8.

2. The method for preparing the bimetallic perovskite loaded graphene-like carbon nitride photocatalyst according to claim 1, wherein $SbCl_3$, AgCl, HCl, CsCl in step (11) are in an amount of 1 mmol, 1 mmol, 12 ml, 2 mmol, respectively.

3. The method for preparing the bimetallic perovskite loaded graphene-like carbon nitride photocatalyst according to claim 1, wherein a temperature for heating and dissolving in step (11) is 80° C.

4. The method for preparing the bimetallic perovskite loaded graphene-like carbon nitride photocatalyst according to claim 1, wherein the sediment is collected and washed with ethanol and finally dried in an oven at 120-150° C. for 5-7 hours in step (11).

5. The method for preparing the bimetallic perovskite loaded graphene-like carbon nitride photocatalyst according to claim 1, wherein the melamine in step (12) is in an amount of 10 g.

6. The method for preparing the bimetallic perovskite loaded graphene-like carbon nitride photocatalyst according to claim 1, wherein the calcination in step (12) is performed under a calcination temperature of 450-500° C., a calcination time of 0.5-2 hours and a heating rate of 10-15° C./min.

7. The method for preparing the bimetallic perovskite loaded graphene-like carbon nitride photocatalyst according to claim 1, wherein the solvent in step (13) is one or more of ethanol and isopropanol.

8. The method for preparing the bimetallic perovskite loaded graphene-like carbon nitride photocatalyst according to claim 1, wherein the ultrasound is performed for 10-30 minutes followed by stirring for 3-5 hours in step (13).

* * * * *